(12) United States Patent
Castro Ramos et al.

(10) Patent No.: US 11,738,624 B2
(45) Date of Patent: Aug. 29, 2023

(54) AIR REGISTER ASSEMBLY

(71) Applicant: Ford Global Technologies, LLC, Dearborn, MI (US)

(72) Inventors: Jesus Edgar Castro Ramos, Huixquilucan (MX); Carlos Ramirez de Santiago, Mexico City (MX); Jorge Araujo Nieto, Calimaya (MX)

(73) Assignee: Ford Global Technologies, LLC, Dearborn, MI (US)

( * ) Notice: Subject to any disclaimer, the term of this patent is extended or adjusted under 35 U.S.C. 154(b) by 296 days.

(21) Appl. No.: 16/991,260

(22) Filed: Aug. 12, 2020

(65) Prior Publication Data

US 2022/0048367 A1 Feb. 17, 2022

(51) Int. Cl.
B60H 1/34 (2006.01)

(52) U.S. Cl.
CPC .................. B60H 1/3421 (2013.01)

(58) Field of Classification Search
CPC ............... B60H 1/3414; B60H 1/3421; B60H 2001/3471
See application file for complete search history.

(56) References Cited

U.S. PATENT DOCUMENTS

| 3,196,895 | A | 7/1965 | Dayus |
| 4,559,868 | A | 12/1985 | Nonaka et al. |
| 5,599,230 | A | 2/1997 | Naruse et al. |
| 6,589,110 | B2 | 7/2003 | Tanabe et al. |
| 6,652,371 | B2 | 11/2003 | Kamio |
| 6,974,377 | B2 | 12/2005 | Gehring et al. |
| 7,455,581 | B2 | 11/2008 | Gehring et al. |
| 9,513,027 | B2 | 12/2016 | Londiche et al. |
| 2004/0152412 | A1 | 8/2004 | Gehring et al. |
| 2007/0111653 | A1 | 5/2007 | Endou |
| 2014/0302769 | A1 | 10/2014 | Sawada |
| 2017/0259649 | A1* | 9/2017 | Shibata ................ B60H 1/3421 |
| 2018/0022180 | A1 | 1/2018 | Lin et al. |
| 2018/0283729 | A1* | 10/2018 | Terasawa ............ F24F 13/1426 |

FOREIGN PATENT DOCUMENTS

| CN | 101522450 A | 9/2009 |
| CN | 102741075 B | 12/2014 |
| DE | 102005061722 A1 | 6/2007 |

(Continued)

OTHER PUBLICATIONS

Schneider J, DE-202012100086-U1 and translation, Apr. 2012.*
Gruenbeckt, DE-202012100243-U1 and translation, May 2012.*
Bourdon J, FR-3043361-A1 and translation, May 2017.*

*Primary Examiner* — Steven S Anderson, II
(74) *Attorney, Agent, or Firm* — Vichit Chea; Price Heneveld LLP

(57) ABSTRACT

A vehicle air register assembly includes a barrel. An adjustment member extends between a first side and a second side of the barrel. The adjustment member includes a housing and an engagement feature. A plurality of vanes are pivotally coupled to the barrel, each vane extends perpendicular to the adjustment member. Each vane defines a recess. The engagement feature extends through each recess. A knob assembly is coupled to the housing. The knob assembly includes a knob, a connector, and a base. The connector and the base are disposed within the housing.

16 Claims, 12 Drawing Sheets

(56) References Cited

FOREIGN PATENT DOCUMENTS

| | | |
|---|---|---|
| DE | 102009007037 A1 | 8/2010 |
| DE | 202012100980 U1 | 7/2012 |
| EP | 3199393 A1 | 8/2017 |
| JP | 2005306224 A | 11/2005 |
| JP | 2006006365 A | 11/2006 |
| JP | 2008543664 A | 12/2008 |
| JP | 2009096279 A | 5/2009 |
| JP | 4678526 B2 | 4/2011 |
| JP | 4816381 B2 | 11/2011 |
| JP | 2017159876 A | 9/2017 |
| KR | 20090132178 A | 12/2009 |
| WO | 2014162670 A1 | 10/2014 |
| WO | 2016013857 A1 | 1/2016 |

* cited by examiner

AIR REGISTER ASSEMBLY

FIELD OF THE DISCLOSURE

The present disclosure generally relates to an air register assembly. More specifically, the present disclosure relates to an air register assembly for a vehicle.

BACKGROUND OF THE DISCLOSURE

Vehicles typically include ductwork that extends through various portions of a vehicle, including within a dashboard. The ductwork may connect a heating, ventilation, and air conditioning system with a register for providing air to an interior of the vehicle. The registers can direct air to different locations within the interior of the vehicle.

SUMMARY OF THE DISCLOSURE

According to at least one aspect of the present disclosure, a vehicle air register assembly includes a barrel. An adjustment member extends between a first side and a second side of the barrel. The adjustment member includes a housing and an engagement feature. A plurality of vanes are pivotally coupled to the barrel. Each vane defines a recess. The engagement feature extends through each recess. A knob assembly is coupled to the housing. The knob assembly includes a knob, a connector, and a base. The connector and the base are disposed within the housing.

According to another aspect of the present disclosure, an air register assembly for a vehicle includes a barrel. A vane is pivotally coupled to the barrel. The vane defines a recess. An adjustment member is configured to movably engage a side of the barrel. The adjustment member is disposed within the recess. A linking member is disposed within a channel defined by the adjustment member. The linking member is coupled to the vane within the recess. A knob assembly is coupled to the adjustment member.

According to another aspect of the present disclosure, an air register assembly for a vehicle includes a barrel. A vane is pivotally coupled to the barrel. An adjustment member has a housing and an engagement feature that extends from the housing. The engagement feature is coupled to the vane. A knob assembly includes a knob and a base. The base defines a first gear. The knob and the base are disposed on opposing sides of the housing. A door assembly includes a second gear. The first gear is configured to engage the second gear to move the door assembly between a first position and a second position.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
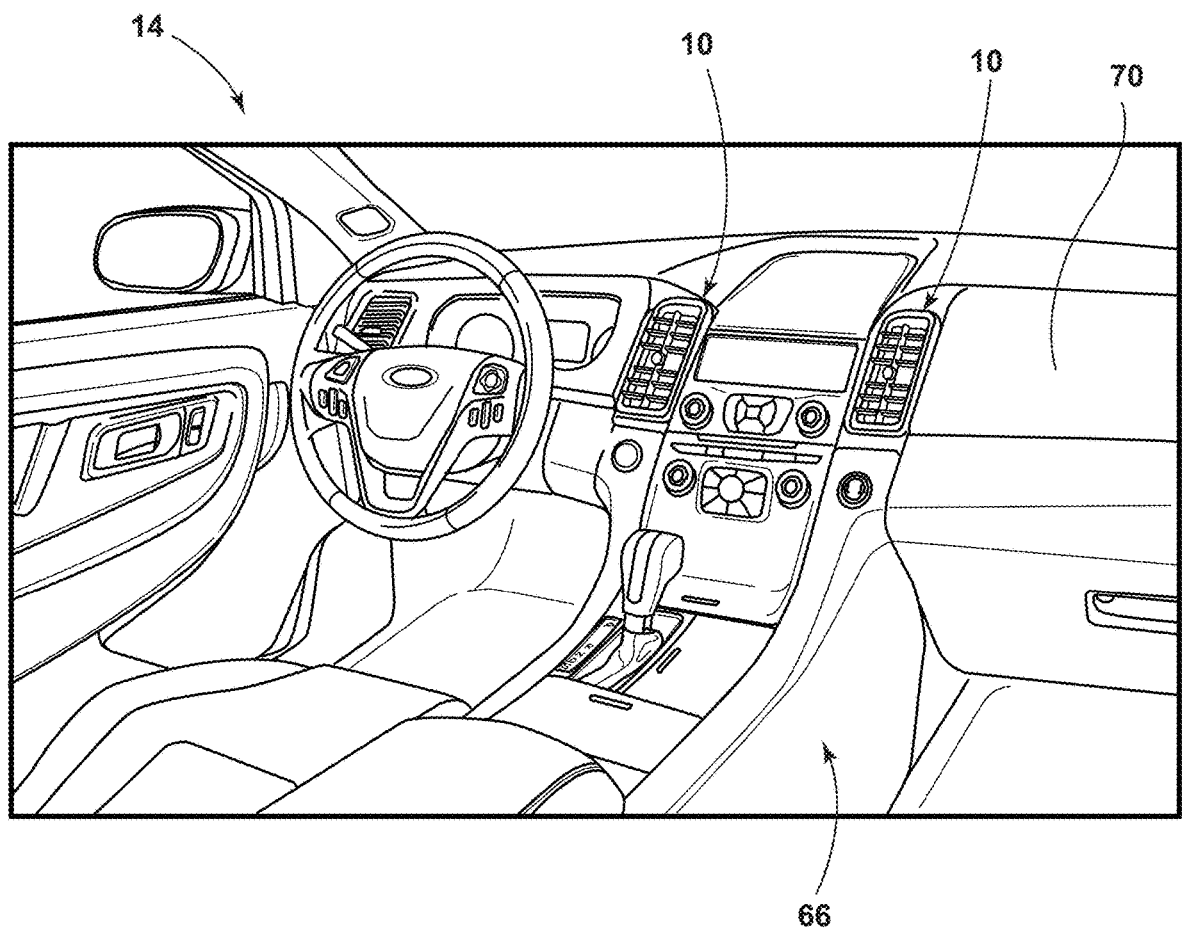
FIG. 1 is a front perspective view of a dashboard within a passenger cabin of a vehicle, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-17, reference numeral 10 generally refers to an air register assembly for a vehicle 14 that includes a barrel 18. An adjustment member 22 extends between a first side 26 and a second side 30 of the barrel 18. The adjustment member 22 includes a housing 34 and an engagement feature 38. A plurality of vanes 42 is pivotally coupled to the barrel 18. Each vane 42 defines a recess 46. The engagement feature 38 extends through each recess 46. A knob assembly 50 is coupled to the housing 34. The knob assembly 50 includes a knob 54, a connector 58, and a base 62. The connector 58 and the base 62 are disposed within the housing 34.

Referring to FIG. 1, the vehicle 14 can include a passenger cabin 66. The vehicle 14 may include a trim panel 70 configured as a dashboard disposed in a vehicle-forward portion of the passenger cabin 66. The vehicle 14 may include a heating, ventilation, and air conditioning (HVAC) system disposed in the vehicle-forward portion of the vehicle 14. The HVAC system typically provides conditioned air into the passenger cabin 66 through one or more air register assemblies 10. It is contemplated that one or more air register assemblies 10 can be coupled to the trim panel 70 and/or disposed elsewhere in the passenger cabin 66. The register assemblies 10 may be positioned to provide an airflow to various locations within the passenger cabin 66. The HVAC system can be in fluid communication with the air register assemblies 10 and the air register assemblies 10 can direct air into the passenger cabin 66.

The vehicle 14 may be a sedan, a sport utility vehicle, a van, a truck, a crossover, or another style vehicle 14. In various examples, the vehicle 14 may be a manually operated vehicle 14 (e.g., with a human driver), a fully autonomous vehicle 14 (e.g., with no human driver), or a partially autonomous vehicle 14 (e.g., operated with or without a human driver). Additionally, the vehicle 14 may be utilized for personal and/or commercial purposes, such as, for ride-providing services (e.g., chauffeuring) and/or ride-sharing services.

Figure 2:
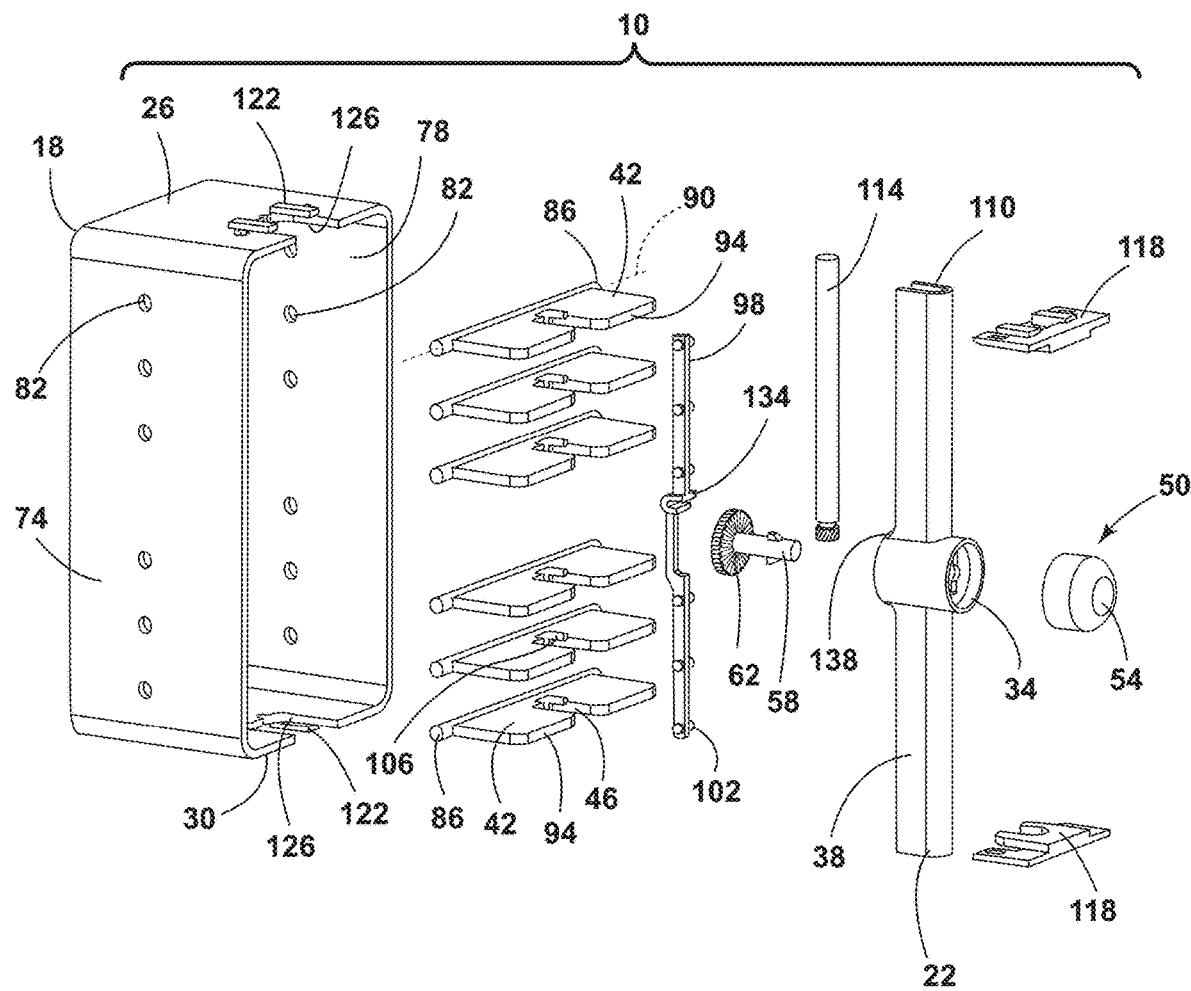
FIG. 2 is an exploded view of an air register assembly of a vehicle, according to one example.

Referring to FIG. 2, the air register assembly 10 can include the barrel 18, which has the first and second sides 26, 30 configured as upper and lower sides. The barrel 18 further includes a third side 74 and a fourth side 78, each extending between the first and second sides 26, 30. As illustrated, the barrel 18 has a rectangular shape with a greater longitudinal extent than lateral extent. The shape and/or size of the barrel 18 may vary based on the location of the air register assembly 10 within the vehicle 14.

Each vane 42 generally extends between the third and fourth sides 74, 78 of the barrel 18. The vanes 42 can be arranged parallel to one another in a spaced-apart configuration. The third and fourth sides 74, 78 each define apertures 82 aligned with one another to receive a pivot member 86 of a corresponding vane 42 to couple the vane 42 to the barrel 18. The pivot member 86 is generally retained parallel with the first and second sides 26, 30.

The vanes 42 are configured to pivot between different angles. A rotational axis 90 of each vane 42 extends longitudinally through the pivot member 86. The vanes 42 are configured to pivot about the corresponding rotational axis 90 to pivot between different angles and, accordingly, direct airflow in different directions.

Each vane 42 defines the recess 46 in a side opposite the pivot member 86. The recess 46 of each vane 42 extends from an edge 94 of the vane 42 toward the pivot member 86. The recesses 46 of the vanes 42 are configured to vertically align with one another. A linking member 98 extends through a space defined by each recess 46 and couples to each vane 42 within the respective recess 46. The linking member 98 extends substantially perpendicular to each of the vanes 42. Each of the vanes 42 coupled with the linking member 98 may pivot about the respective rotational axis 90 simultaneously as the linking member 98 is adjusted.

The linking member 98 is configured to move between the first and second sides 26, 30 of the barrel 18. The linking member 98 includes a plurality of protrusions 102. Each protrusion 102 is configured to engage a hook 106 extending from each of the vanes 42. The hooks 106 extend from the vanes 42 proximate the recess 46. In various examples, the hook 106 extends into the space defined by the recess 46. The hook 106 may engage the protrusions 102 to couple the vanes 42 to the linking member 98. The coupling of the hooks 106 to the protrusions 102 within the recess 46 provides an interface between the linking member 98 and the vanes 42 proximate the rotational axis 90 of each vane 42.

According to various aspects, the linking member 98 is coupled to the adjustment member 22. The adjustment member 22 can extend transverse to the vanes 42 and through the space defined by the recesses 46. The adjustment member 22 may include the housing 34 and the engagement feature 38. The housing 34 may be centrally located, such that the engagement feature 38 extends in opposing directions from the housing 34. The engagement feature 38 may be substantially elongated and the housing 34 may have a cylindrical or frusto-conical shape.

Referring still to FIG. 2, the adjustment member 22 may define a channel 110 and the linking member 98 may be disposed within the channel 110. The linking member 98 may be substantially concealed from view from within the passenger cabin 66 (FIG. 1) by the adjustment member 22. The adjustment member 22 may be movably engaged with the barrel 18. The adjustment member 22 may be configured to move vertically between the first side 26 and the second side 30, which simultaneously moves the linking member 98. When the adjustment member 22 and the linking member 98 are adjusted, the vanes 42 may also be adjusted between different angles. The adjustment member 22 may be configured to operate as a vertical vane to direct air flowing through the air register assembly 10.

The knob assembly 50 may be coupled to the adjustment member 22. The knob assembly 50 may be in a fixed position relative to the adjustment member 22. The knob assembly 50 may include the knob 54 coupled to the base 62 via the connector 58. The knob 54 may be coupled to a first side of the housing 34, and the base 62 and the connector 58 may be disposed within the housing 34. In various examples, the knob 54 may be coupled to an A-surface of the adjustment member 22. As used herein, the term "A-surface" refers to the surface of any component within the vehicle 14 that is visible and/or contactable by an occupant of the vehicle 14 and the component is in an assembled state. In comparison, the term "B-surface" refers to a surface of any component within the vehicle 14 that is concealed and/or non-contactable by an occupant of the vehicle 14 and the component is in an assembled state. Accordingly, the knob 54 can be disposed adjacent to the A-surface of the adjustment member 22 and the channel 110 can be defined in the B-surface of the adjustment member 22.

According to various aspects, the air register assembly 10 may include an elongate member 114 disposed at least partially within the channel 110 of the adjustment member 22. The elongate member 114 may be disposed between the adjustment member 22 and the linking member 98. The elongate member 114 may be disposed within the channel 110 of the engagement feature 38 disposed on a single side of the housing 34. Accordingly, the elongate member 114 may extend a portion of the length of the adjustment member 22.

Figure 3:
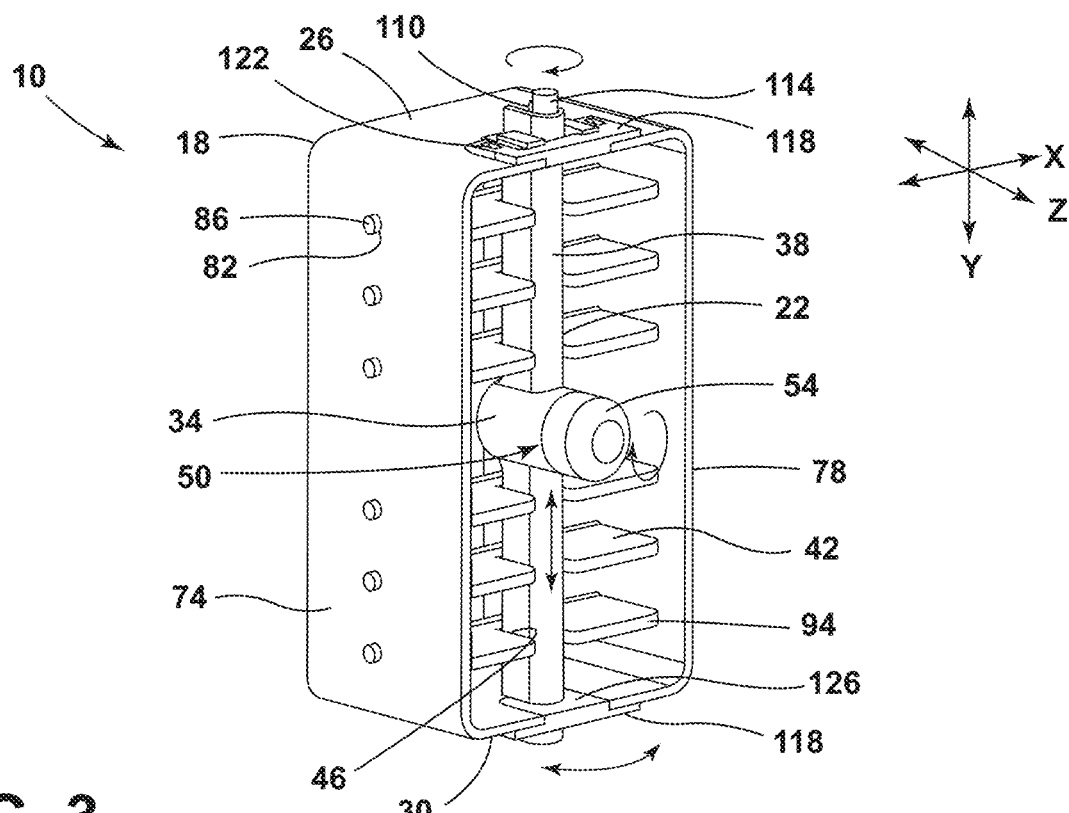
FIG. 3 is a side perspective view of a front of the air register assembly of FIG. 2.

Referring to FIGS. 2 and 3, the air register assembly 10 can include one or more retaining features 118. As illustrated, the air register assembly 10 includes two retaining features 118. The retaining features 118 are configured to engage clips 122 extending from the first and second sides 26, 30 of the barrel 18. The engagement between the retaining features 118 and the clips 122 operate to couple the adjustment member 22 to the barrel 18. The adjustment member 22 extends between the first side 26 and the second side 30 of the barrel 18. The first and second sides 26, 30 define grooves 126 configured to receive the adjustment member 22. Accordingly, the adjustment member 22 can extend through grooves 126 and beyond each of the first side 26 and the second side 30 of the barrel 18. The adjustment member 22 can be retained with the grooves 126 between the barrel 18 and the retaining features 118.

Referring to FIG. 3, the vanes 42 extend between the third and fourth sides 74, 78 with each pivot member 86 extending through the apertures 82 defined in each of the third and fourth sides 74, 78. The pivot member 86 is disposed upstream of the edge 94 defining the recess 46. Air flowing through the air register assembly 10 first flows over the pivot member 86 and subsequently flows over the edge 94 of each vane 42 and into the passenger cabin 66 (FIG. 1). Accordingly, the recess 46 of each vane 42 can be oriented toward the passenger cabin 66 (FIG. 1) of the vehicle 14.

The vanes 42 may be arranged into groupings, as illustrated in FIG. 3. A first grouping of vanes 42 may be disposed adjacent to the engagement feature 38 on one side of the housing 34 and a second grouping of vanes 42 may be disposed adjacent to the engagement feature 38 on a second side of the housing 34. As illustrated in FIG. 3, one grouping of vanes 42 may be disposed vertically above the housing 34 and the second grouping of vanes 42 may be disposed vertically below the housing 34. A space may be defined between the two groupings of vanes 42 to accommodate the housing 34. Accordingly, the housing 34 of the adjustment member 22 may not interfere with the rotation of vanes 42.

Figure 4:
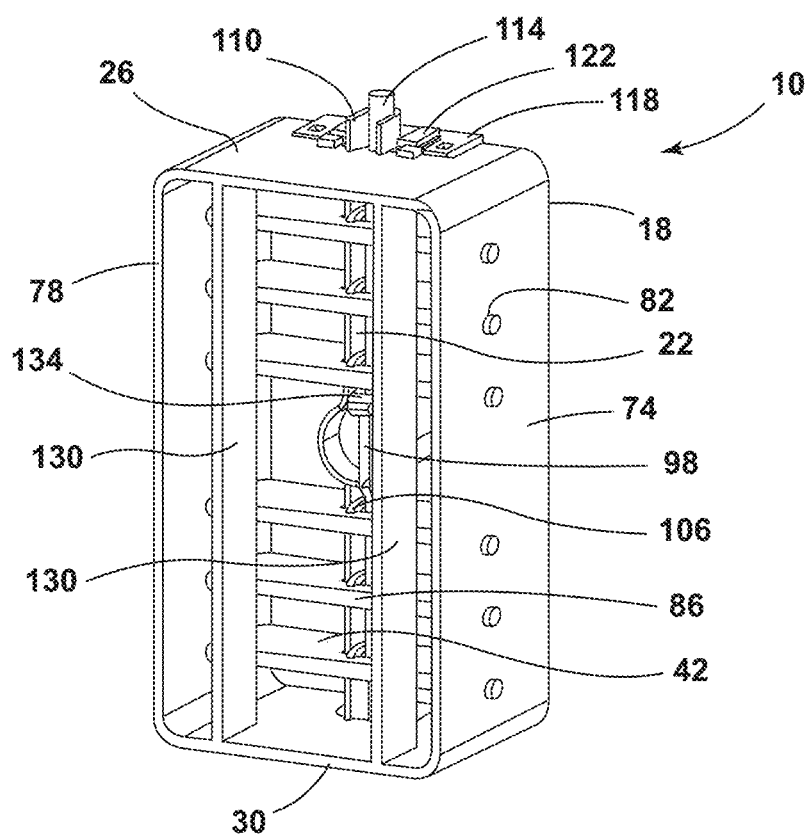
FIG. 4 is a side perspective view of a rear of the air register assembly of FIG. 2.

Referring to FIG. 4, the barrel 18 may include additional vertical vanes 130 extending between the first and second sides 26, 30 of the barrel 18. The vertical vanes 130 may be disposed upstream of the plurality of vanes 42. The vertical vanes 130 may extend substantially perpendicular to each of the vanes 42. The vertical vanes 130 may be integrally formed with the barrel 18, such that the vertical vanes 130 and the barrel 18 are a single molded component. As illustrated in FIG. 4, the air register assembly 10 includes two vertical vanes 130 configured to direct airflow.

Figure 5:
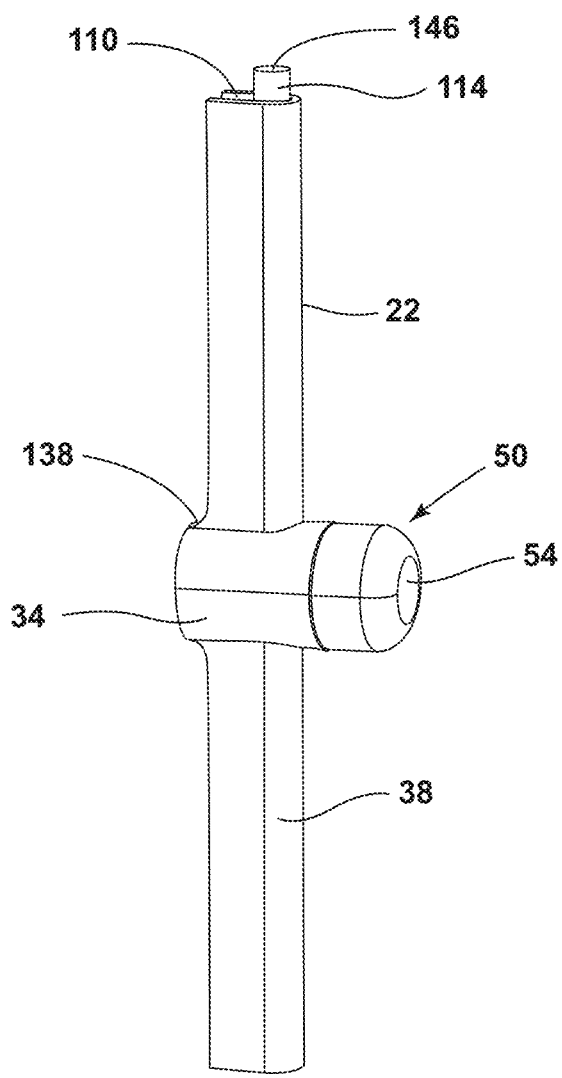
FIG. 5 is a side perspective view of an adjustment member and a knob assembly of an air register assembly, according to one example.
Figure 6:
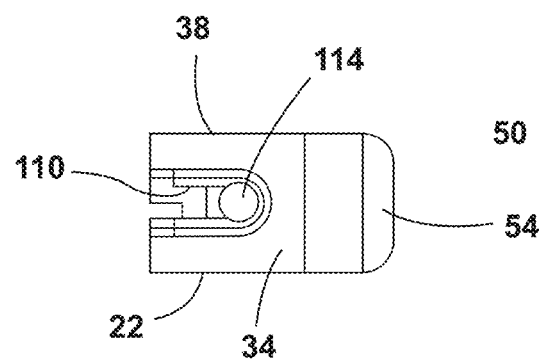
FIG. 6 is a top plan view of the adjustment member and the knob assembly of FIG. 5.

Referring to FIGS. 5 and 6, the adjustment member 22 may include the housing 34 with the engagement feature 38 extending vertically in opposing directions from the housing 34. Accordingly, the housing 34 may be centrally located within the engagement feature 38. The engagement feature 38 may be substantially U-shaped defining the channel 110. The channel 110 may extend the entire length of the adjustment member 22. As such, the channel 110 may extend through the housing 34. An interior of the housing 34 may be hollow and in fluid communication with the remainder of the channel 110. The elongate member 114 may extend from the housing 34 through the channel 110 of a portion of the engagement feature 38 and extend beyond the engagement feature 38.

Figure 7:
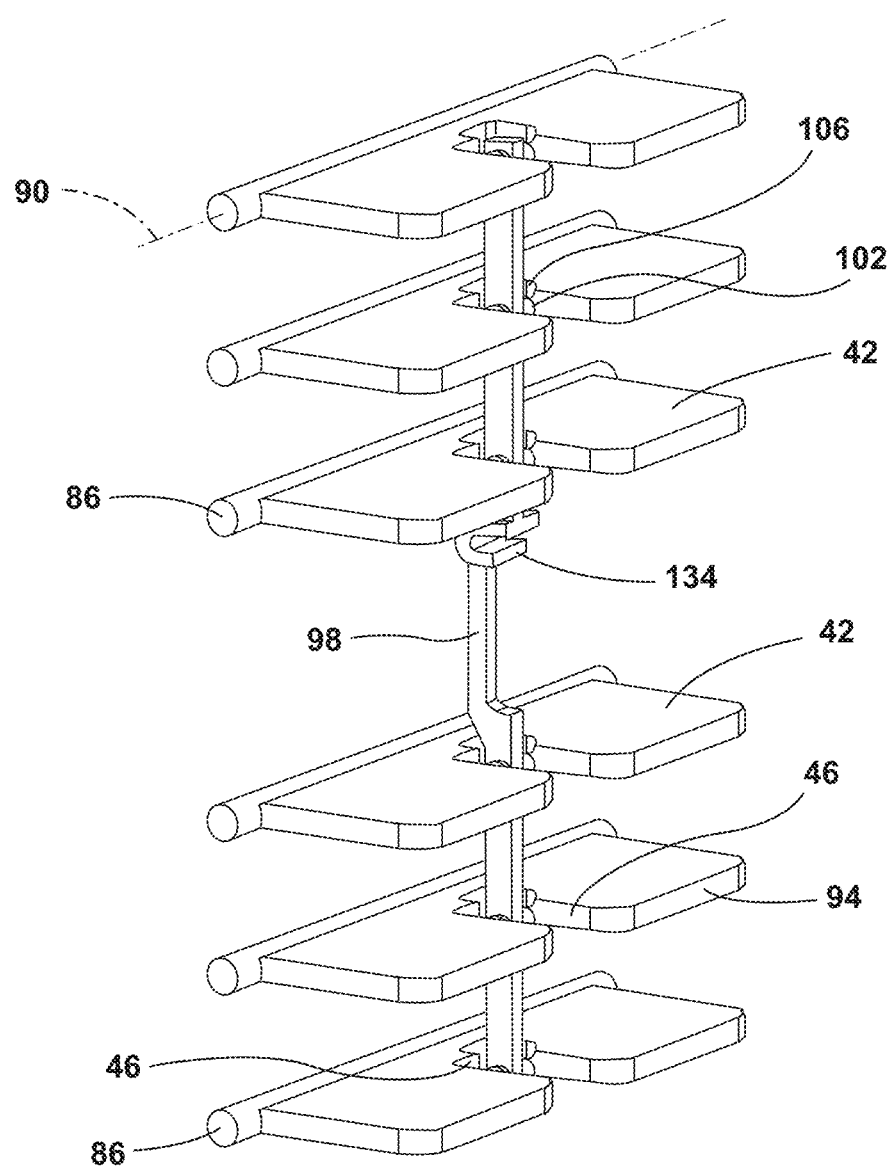
FIG. 7 is a side perspective view of a plurality of vanes coupled to a linking member for an air register assembly, according to one example.

Referring to FIG. 7, each vane 42 is coupled to the linking member 98. The hook 106 of each vane 42 engages the protrusions 102 of the linking member 98. In various examples, the linking member 98 extends through each recess 46 of each vane 42. Accordingly, the linking member 98 may be coupled to each vane 42 proximate the rotational axis 90. The linking member 98 is disposed proximate the rotational axis 90 may be advantageous for reducing movement of the vanes 42 to adjust the vanes 42 to a selected angle to direct air. The linking member 98 may be configured to move vertically within the barrel 18, as illustrated in FIG. 7. As the linking member 98 is adjusted vertically, the edge 94 of the vanes 42 may be adjusted vertically, thereby rotating the vanes 42 movement of the linking member 98.

Figure 8:
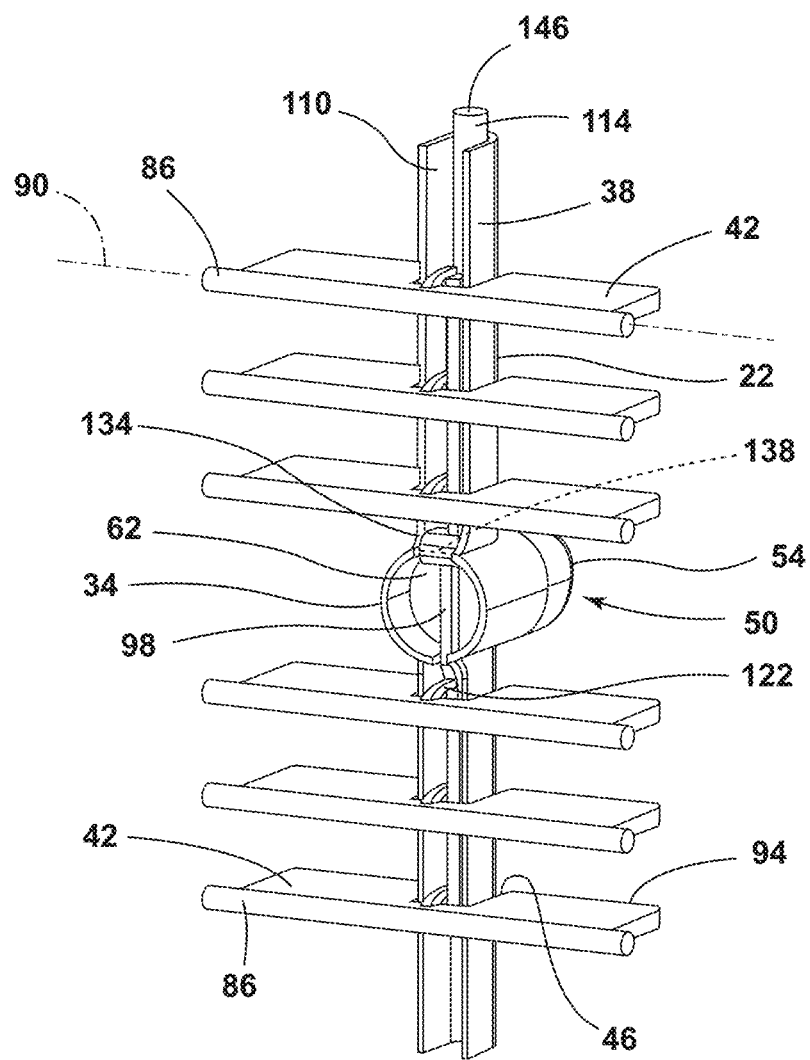
FIG. 8 is a rear perspective view of a plurality of vanes coupled to an adjustment member for an air register assembly, according to one example.

Referring to FIG. 8, the linking member 98 may be disposed within the channel 110 defined by the adjustment member 22. Accordingly, the adjustment member 22 may likewise extend through the recess 46 of each vane 42. The linking member 98 may include a coupling feature 134 to couple the linking member 98 to the adjustment member 22. The adjustment member 22 can define a projection or pin 138, or another similar structure, that the coupling feature 134 of the linking member 98 can engage. As illustrated in FIG. 8, the coupling feature 134 may be disposed proximate interface between the housing 34 and the engagement feature 38 of the adjustment member 22. As such, as the adjustment member 22 is moved, the linking member 98 is simultaneously moved.

Figure 9:
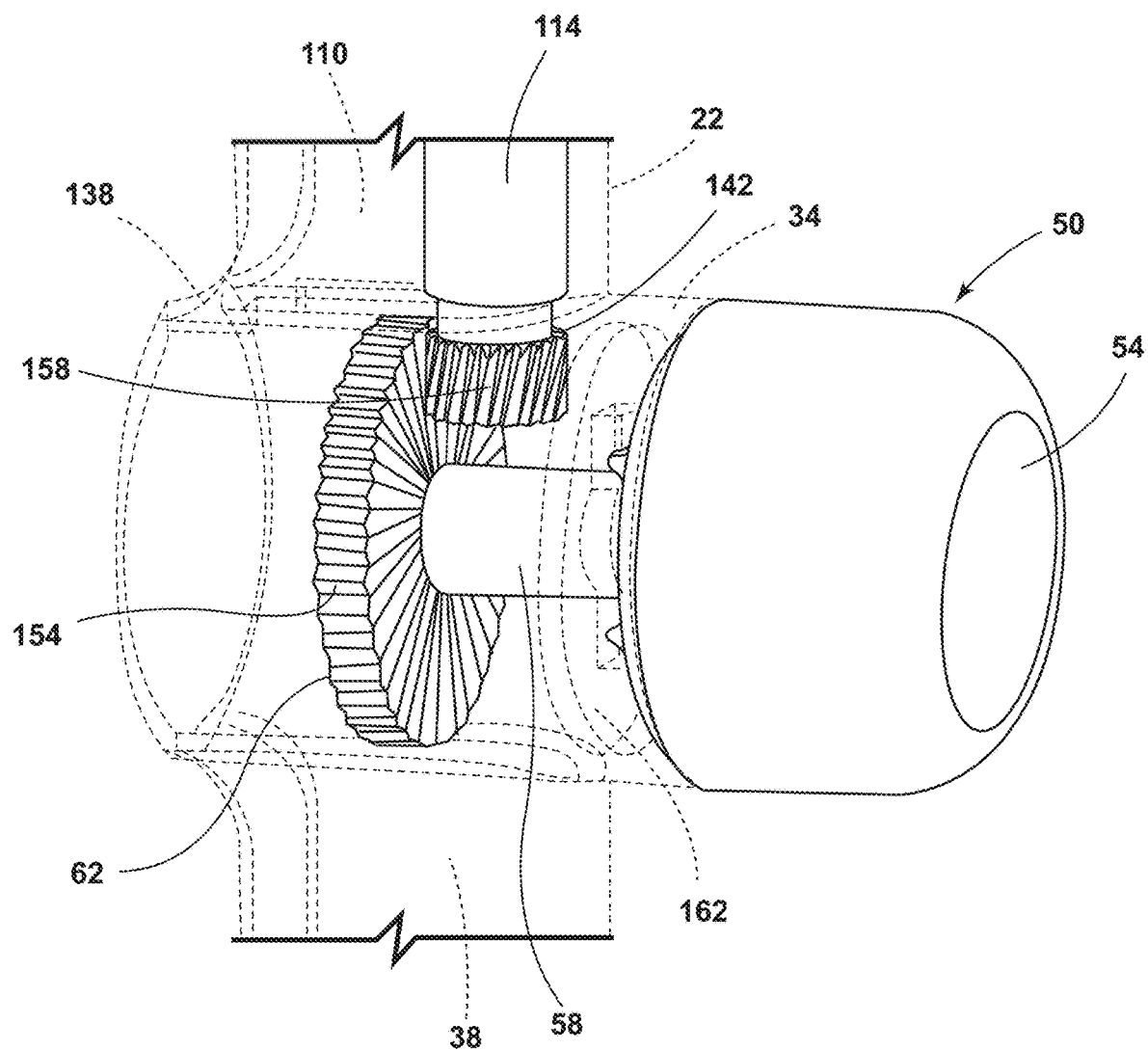
FIG. 9 is a side perspective view of a knob assembly engaging an elongate member for an air register assembly, according to one example.

Referring to FIGS. 8 and 9, the linking member 98 may be disposed adjacent to the base 62 of the knob assembly 50 when the linking member 98 is coupled to the adjustment member 22. The housing 34 can have a greater thickness than the engagement feature 38 to accommodate the knob assembly 50. The elongate member 114 generally extends from the housing 34 through a portion of the engagement feature 38 and through the barrel 18 (FIG. 2). A proximal end 142 of the elongate member 114 can extend into the interior of the housing 34 and be disposed adjacent to the knob assembly 50. The distal end 146 of the elongate member 114 may extend beyond the adjustment member 22 and be disposed proximate the first side 26 of the barrel 18 (FIG. 3). As illustrated in FIGS. 8 and 9, the elongate member 114 extends vertically upwards from the housing 34; however, it is contemplated that the elongate member 114 may also extend vertically downward through the lower portion of the adjustment member 22.

Referring still to FIG. 9, the knob assembly 50 may be rotatably coupled to the adjustment member 22. The knob 54 may be disposed adjacent to the A-surface of the housing 34, and the connector 58 and the base 62 may be disposed within the interior of the housing 34. The proximal end 142 of the elongate member 114 may be disposed between the base 62 and the knob 54. The knob assembly 50 is generally in a fixed position relative to the adjustment member 22. An occupant of the vehicle 14 (FIG. 1) can utilize the knob 54 to adjust the adjustment member 22.

According to various aspects, the knob 54 is configured to rotate about a rotational axis 150. The rotational axis 150 can be defined through a longitudinal axis of the connector 58 and can be substantially horizontal. The base 62 generally defines a first gear 154 and the proximal end 142 of the elongate member 114 can define a second gear 158. The first and second gears 154, 158 can be separate components coupled to the base 62 and the elongate member 114, respectively, or may be integrally formed components molded into the base 62 and the elongate member 114.

The first and second gears 154, 158 are configured to engage one another. In various examples, each of the first and second gears 154, 158 may be disposed within the housing 34 and concealed from view. As the knob 54 is rotated, the base 62 is rotated via the connection through the connector 58. The first gear 154 can engage the second gear 158 to translate the rotation of the knob 54 into rotation of the elongate member 114. Accordingly, the first and second gears 154, 158 can translate rotation about a horizontal axis into rotation about a vertical axis.

According to various aspects, the knob assembly 50 may include a guide feature 162 disposed proximate the knob 54 and arranged parallel to the base 62. The guide feature 162 may guide the position of the proximal end 142 of the elongate member 114 to maintain the engagement between the first and second gears 154, 158. The guide feature 162 serves as support for a rotational axis of the connector 58, and the connector 58 may define gears to engage the second gear 158 of the elongate member 114.

Referring to FIGS. 1-9, the air register assembly 10 is configured to direct air into the passenger cabin 66 of the vehicle 14. The barrel 18 may be rotatably coupled to the trim panel 70. Accordingly, the barrel 18 may be configured to pivot or rotate. Typically, the barrel 18 is configured to rotate about a vertical axis, such as, for example, a y-axis of the air register assembly 10. The adjustment member 22 is configured to slide or move vertically along a vertical axis (e.g., the y-axis). Accordingly, the adjustment member 22 may be movably engaged with the first and second sides 26, 30 of the barrel 18. As the adjustment member 22 is vertically adjusted, the linking member 98 is also vertically adjusted. As the linking member 98 is moved vertically, each vane 42 rotates within the barrel 18. The linking member 98 may be configured to rotate each vane 42 along a horizontal axis (e.g., the rotational axis 90), such as, for example, an x-axis of the air register assembly 10. The linking member 98 may be configured to adjust an angle of each vane 42.

Additionally or alternatively, the knob assembly 50 is configured to rotate about a horizontal axis (e.g., the rotational axis 150), such as, for example, a z-axis of the air register assembly 10. Rotation of the knob assembly 50 can translate to rotation of the elongate member 114 about a vertical axis (e.g., the y-axis) of the air register assembly 10. The distal end 146 of the elongate member 114 may be configured to engage a lever or another mechanism external to the air register assembly 10. For example, the elongate member 114 may be configured to engage doors adjacent to the air register assembly 10, which can open and close a duct of the HVAC system.

The knob assembly 50 may be in a fixed position relative to the adjustment member 22. Accordingly, as the adjustment member 22 is moved relative to the barrel 18, the knob assembly 50 is also moved. As the adjustment member 22 is moved, the knob assembly 50 can be maintained in a horizontal position. Accordingly, when the adjustment member 22 is in a first position relative to the barrel 18 (e.g., a lowered position) the knob assembly 50 can be in the horizontal position, and when the adjustment member 22 is in a second position (e.g., a raised position) the knob assembly 50 can remain in the horizontal position. In this way, when the vanes 42 are positioned at a first angle and when the vanes 42 are positioned at a second angle, the knob assembly 50 remains in the horizontal position.

Figure 10:
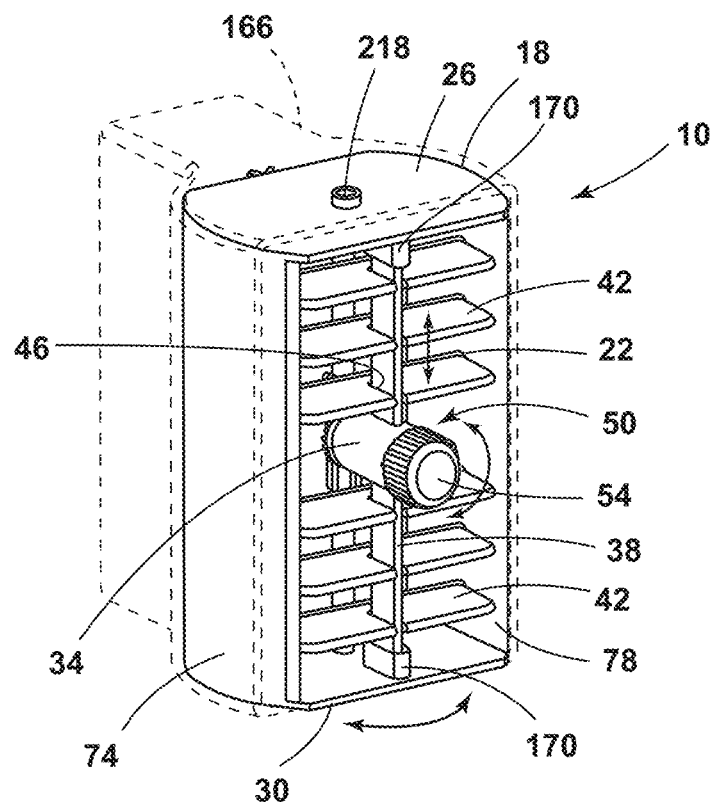
FIG. 10 is a side perspective view of a front of an air register assembly, according to one example.

Referring to FIG. 10, an additional or alternative configuration of the air register assembly 10 is illustrated. The air register assembly 10 is illustrated within a duct 166, which may be in communication with the HVAC system for the vehicle (FIG. 1). The air register assembly 10 includes the barrel 18. The first and second sides 26, 30 can be configured to rotatably couple the air register assembly 10 with the duct 166. The third and fourth sides 74, 78 can be rounded or curved based on the configuration of the duct 166.

The vanes 42 generally extend between the third and fourth sides 74, 78 of the barrel 18. The vanes 42 can be pivotally coupled to the barrel 18 and configured to be adjusted between different angles in response to the movement of the adjustment member 22. The adjustment member 22 can extend between the first and second sides 26, 30 of the barrel 18. Accordingly, the adjustment member 22 can extend generally perpendicular to the vanes 42.

The vanes 42 can each define the recess 46, and the adjustment member 22 can extend through each recess 46. The vanes 42 can be directly coupled to the adjustment member 22. In various examples, the adjustment member 22 may include the housing 34 and the engagement feature 38. The housing 34 may be centrally located within the engagement features 38, such that the engagement feature 38 extends in opposing directions from the housing 34.

The first and second sides 26, 30 of the barrel 18 may each define a receiving cavity 170. The receiving cavity 170 is configured to receive the ends of the adjustment member 22. The adjustment member 22 may be movably engaged with the barrel 18 within the receiving cavities 170. Accordingly, the adjustment member 22 may be adjusted vertically within the barrel 18. The vertical adjustment of the adjustment member 22 can alter the angle of each of the vanes 42.

Figure 11:
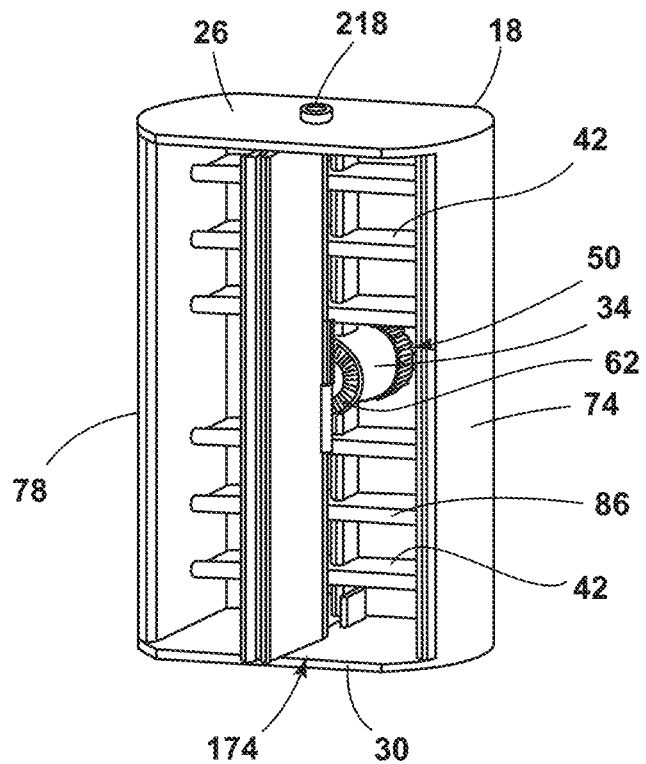
FIG. 11 is a rear perspective view of the air register assembly of FIG. 10.

Referring to FIGS. 10 and 11, the knob assembly 50 can be rotatably coupled to the housing 34. The knob 54 can be disposed on one side of the housing 34, and the base 62 can be disposed on a second opposing side of the housing 34. The base 62 can be configured to engage a door assembly 174 of the air register assembly 10. The door assembly 174 may be disposed upstream of the knob assembly 50 and substantially within the barrel 18.

Figure 12:
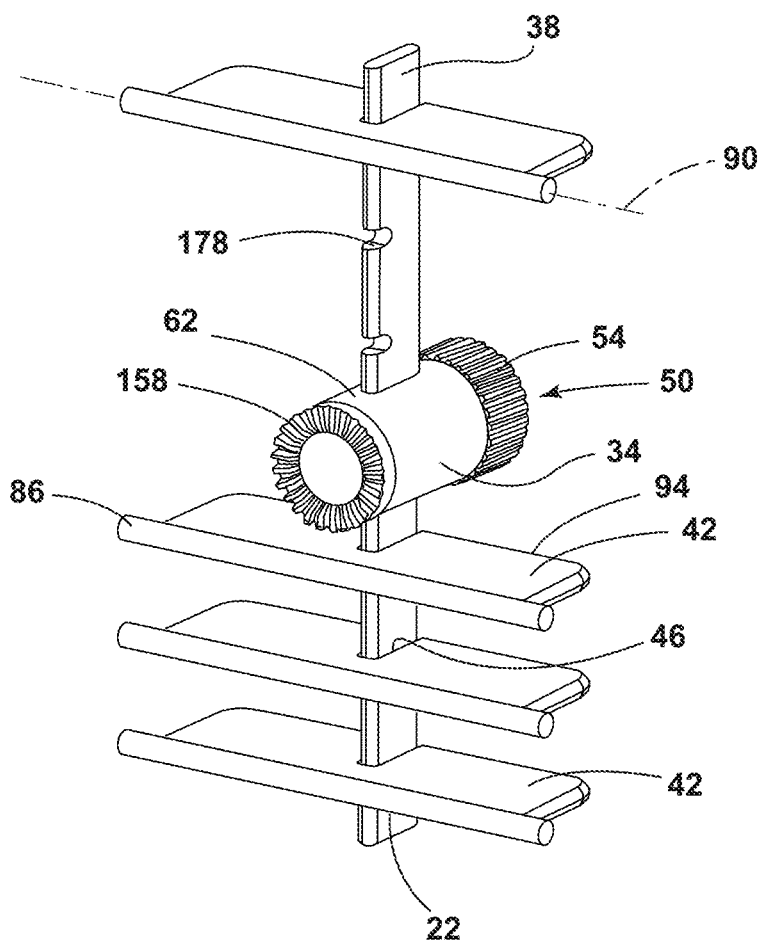
FIG. 12 is a rear perspective view of a plurality of vanes coupled to an adjustment member for an air register assembly, according to one example.

Referring to FIG. 12, the engagement feature 38 of the adjustment member 22 may be elongated extensions. The engagement feature 38 may define a plurality of notches 178 in an upstream edge thereof. Each notch 178 can be configured to receive the vane 42. Accordingly, the adjustment member 22 may be configured to link the vanes 42, such that the vanes 42 can rotate simultaneously with one another. The engagement feature 38 is disposed within the recess 46 of each vane 42. The edge 94 of the vane 42 within the recess 46 can form an interlocking connection with the notch 178. Additionally or alternatively, the vanes 42 and the engagement feature 38 may form a frictional fit and/or an interference fit to retain the vanes 42 within the corresponding notches 178. The interface between the adjustment member 22 and the vanes 42 may be proximate to the pivot member 86 of each vane 42. Accordingly, the interface may be proximate the rotational axis 90 of each vane 42. Each vane 42 can extend around the engagement feature 38 toward a downstream edge of the engagement feature 38.

Figure 13:
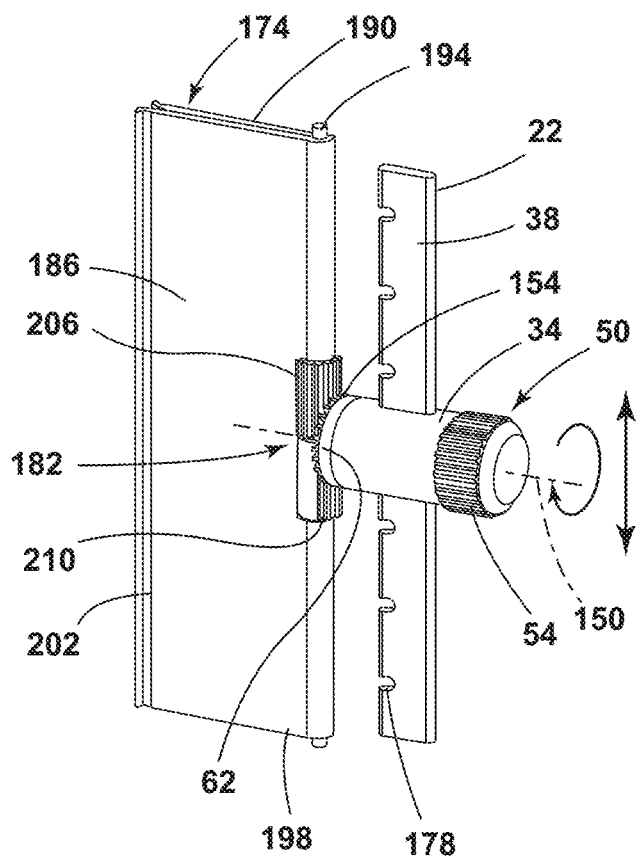
FIG. 13 is a side perspective view of a knob assembly engaging a door assembly of an air register assembly, according to one example.
Figure 14:
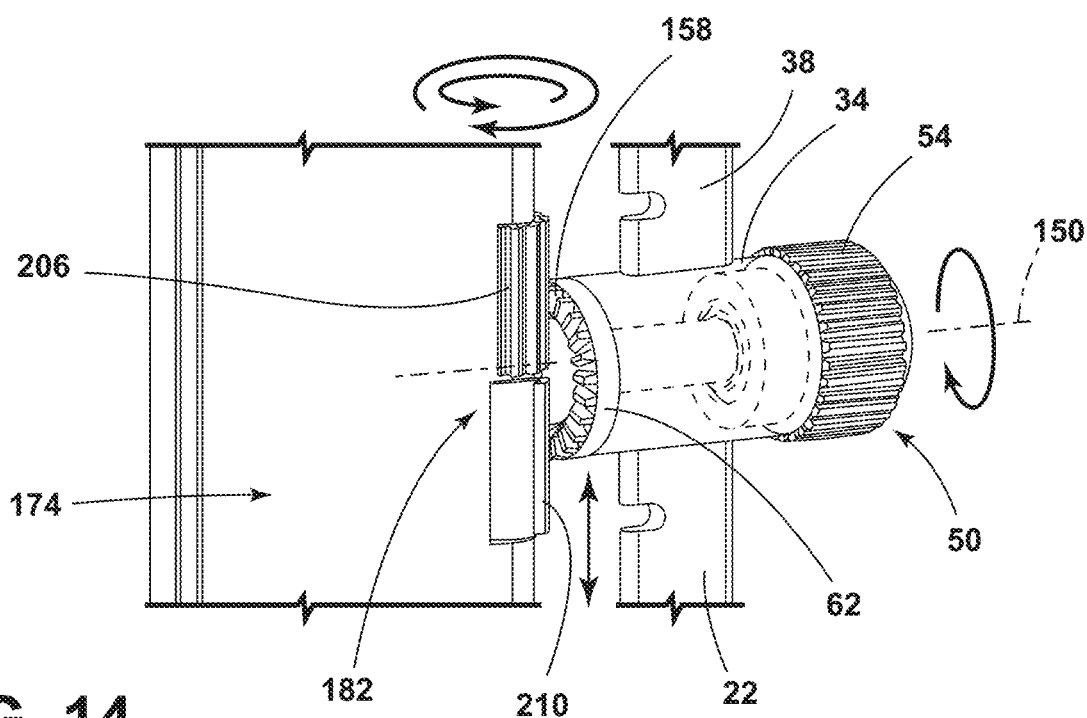
FIG. 14 is a partial rear perspective view of the engagement between the knob assembly and the door assembly of FIG. 13.

Referring to FIGS. 13 and 14, the base 62 of the knob assembly 50 generally defines the first gear 154 and the door assembly 174 can include a gear assembly 182. The door assembly 174 may include a first door 186 and a second door 190. Each of the first and second doors 186, 190 can be pivotally coupled to a pivot feature 194. The pivot feature 194 can be arranged substantially parallel to and adjacent to the adjustment member 22. A first edge 198 of each of the first and second doors 186, 190 can be pivotally coupled to the pivot feature 194. A second edge 202 of each of the first and second doors 186, 190 can extend further into the duct 166 (FIG. 10) away from the passenger cabin 66 (FIG. 1).

The first gear 154 of the base 62 is configured to engage the gear assembly 182 of the door assembly 174. The gear assembly 182 includes a first gear feature 206 coupled to the first door 186 and a second gear feature 210 coupled to the second door 190. As illustrated in FIGS. 13 and 14, the first gear feature 206 is disposed vertically above the second gear feature 210 to allow both the first and second gear features 206, 210 to concurrently engage the first gear 154.

Each of the first and second gear features 206, 210 includes elongated gears. The knob assembly 50 is configured to move vertically with the adjustment member 22 to adjust the angle of the vanes 42. Accordingly, to maintain the engagement between the first gear 154 and the gear assembly 182, the first and second gear features 206, 210 have elongated gears to maintain the engagement as the knob assembly 50 moves with respect to the door assembly 174.

Figure 15:
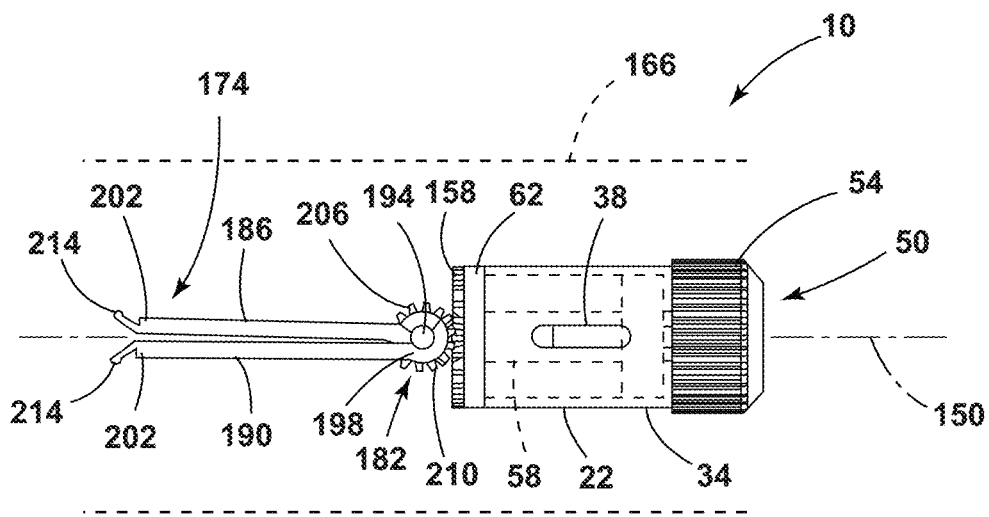
FIG. 15 is a top plan view of a knob assembly of an air register assembly with a door assembly in a first position, according to one example.

Referring to FIGS. 14 and 15, the knob 54 of the knob assembly 50 is disposed on a first side of the housing 34, and the base 62 is disposed on the second side of the housing 34. The knob 54 can be contactable by any occupant within the passenger cabin 66 (FIG. 1). The connector 58 is disposed within the housing 34 and connects the knob 54 with the base 62. Accordingly, when the knob 54 is rotated the base 62 is correspondingly rotated via the connector 58.

Figure 16:
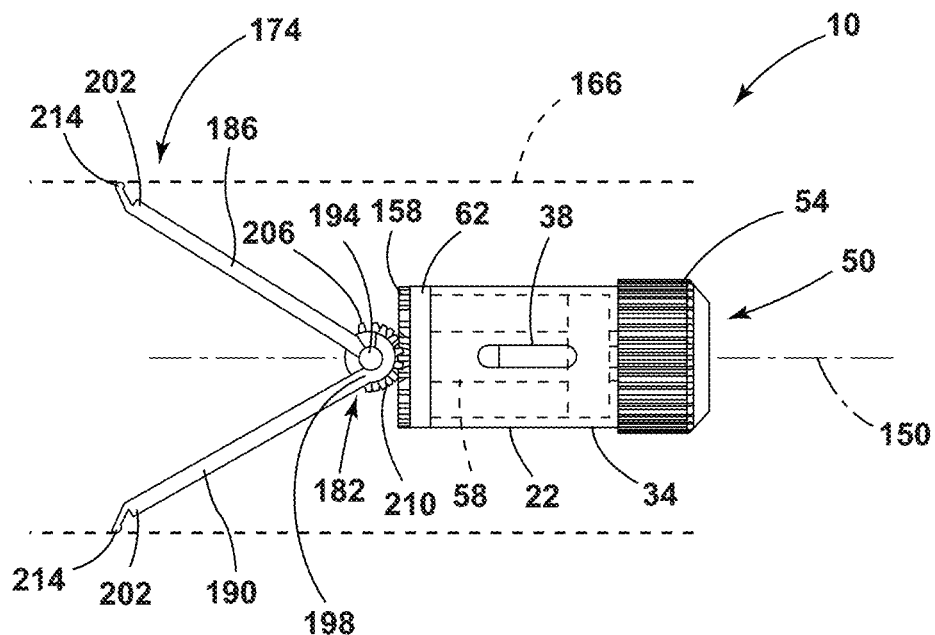
FIG. 16 is a top plan view of the knob assembly of FIG. 15, with the door assembly in a second position.

Referring to FIGS. 15 and 16, the door assembly 174 is operable between a first position (FIG. 15) and a second position (FIG. 16). In the first position, as illustrated in FIG. 15, the first and second doors 186, 190 abut one another and are generally parallel with one another. Accordingly, the second edges 202 of each of the first and second doors 186, 190 are disposed adjacent to one another. In the second position, as illustrated in FIG. 16, the first and second doors 186, 190 define an angle therebetween. Accordingly, the second edges 202 of each of the first and second doors 186, 190 may be spaced-apart from one another. Each of the second edges 202 includes a flange 214 extending at an angle from each of the first and second doors 186, 190. The flanges 214 are configured to engage the duct 166 when the door assembly 174 is in the second position.

When the door assembly 174 is in the first position, the door assembly 174 can operate as a vertical vane to direct air flowing through the air register assembly 10. As such, the air register assembly 10 is in an opened state. When the door assembly 174 is in the second position, the first and second doors 186, 190 abut the duct 166 and prevent airflow from traveling through the air register assembly 10. Accordingly, when the door assembly 174 is in the second position, the air register assembly 10 is in a closed state.

Rotation of the knob 54 of the knob assembly 50 generally translates to the rotation of the door assembly 174 between the first position and the second position. The first and second gear features 206, 210 are configured to allow opposing rotation of each of the first and second doors 186, 190. In this way, as the knob 54 is rotated, the first door 186 rotates in a first direction and the second door 190 rotates in a second opposing direction. When the knob 54 is rotated about the rotational axis 150 in a first direction (e.g., a clockwise direction), the first and second doors 186, 190 may be configured to rotate away from one another. In another example, as the knob 54 is rotated in a second direction (e.g., a counter-clockwise direction), the first and second doors 186, 190 may be configured to rotate toward one another. As the door assembly 174 is disposed within the duct 166, the door assembly 174 may open to a lesser angle to prevent airflow than if the door assembly 174 was disposed outside of the duct 166.

Referring to FIGS. 1 and 9-16, the adjustment member 22 may be configured to adjust vertically within the barrel 18. The vertical adjustment of the adjustment member 22 may adjust the angle of the vanes 42, which can direct airflow to different locations within the passenger cabin 66 of the vehicle 14. Additionally, the barrel 18 may be configured to rotate. For example, the barrel 18 may be configured to rotate about the y-axis extending through the air register assembly 10. The rotation of the barrel 18 can direct the air in a direction that is perpendicular to the direction the vanes 42 can direct the air. Additionally, rotation of the knob assembly 50 can operate the door assembly 174. In various examples, the first and second sides 26, 30 of the barrel 18 can define pivot cavities 218 to receive the pivot feature 194 of the door assembly 174. Accordingly, the door assembly 174 can rotate about a vertical axis (e.g., the y-axis) as the knob assembly 50 is rotated.

According to various aspects, as the adjustment member 22 is adjusted relative to the barrel 18, the angle of the vanes 42 is adjusted. The knob assembly 50 may also be moved with the adjustment member 22. The knob assembly 50 may be in a fixed position relative to the adjustment member 22. Additionally or alternatively, the knob assembly 50 can be disposed in a horizontal position and can remain in a horizontal position when the adjustment member 22 is in different positions and when the vanes 42 are positioned at different angles. The fixed horizontal position of the knob assembly 50 may provide for continued engagement between the knob assembly 50 and the door assembly 174, thereby providing continued operation of the door assembly 174 as other components of the air register assembly 10 are adjusted. Moreover, each of the components may be disposed substantially within the barrel 18, which can provide flexibility for installation of the air register assembly 10 in different styles of vehicles 14.

Figure 17:
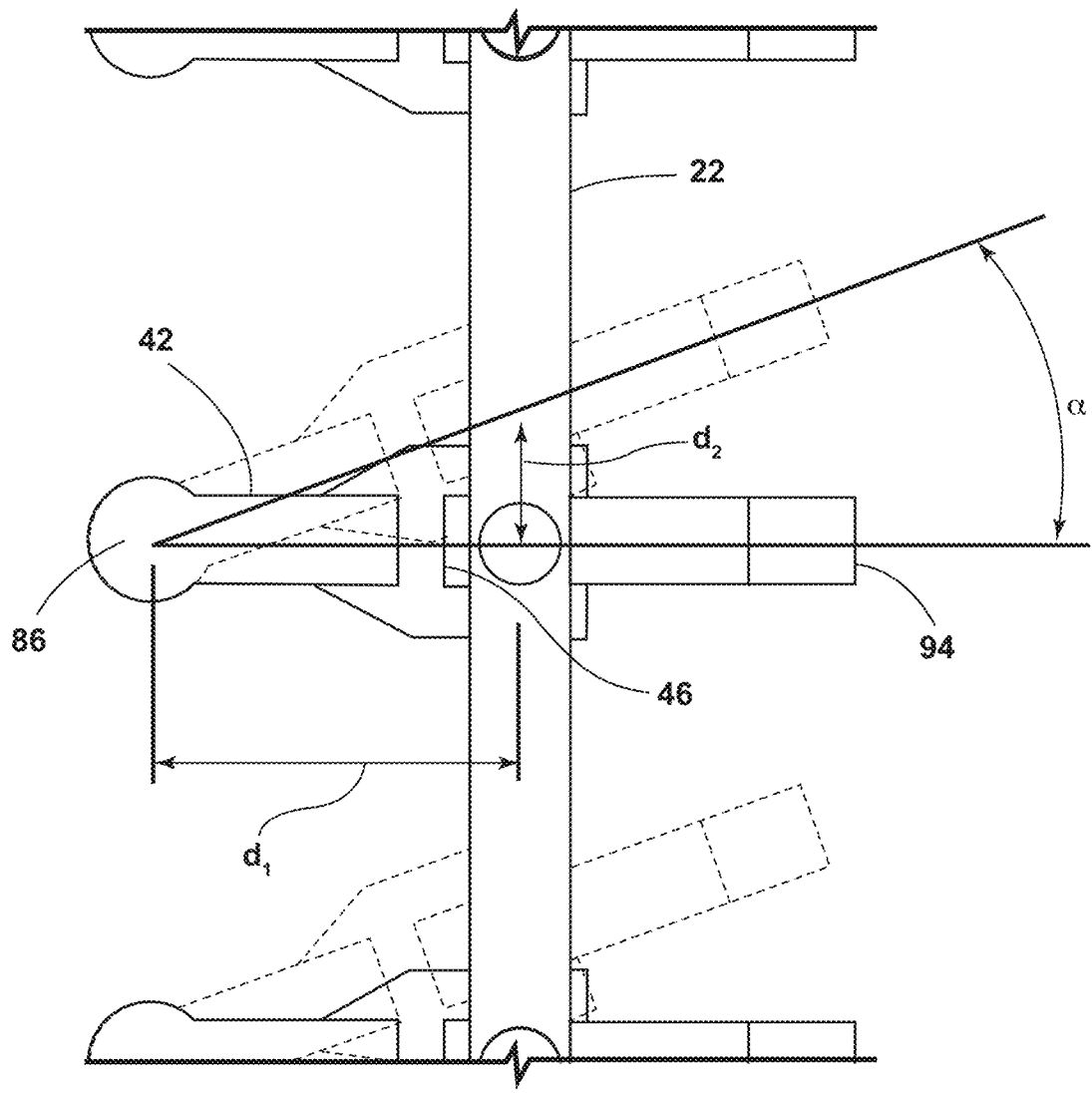
FIG. 17 is a partial side plan view of vanes of the air register assembly rotated between a first angle and a second angle, according to one example.

Referring to FIG. 17, in each of the exemplary configurations described previously herein, the adjustment member 22 is disposed within the recesses 46 of each vane 42. The recesses 46 decrease the distance $d_1$ between the pivot member 86 of each vane 42 and the interface between the adjustment member 22 and the vanes 42. The decreased distance $d_1$ may be advantageous for reducing the vertical movement $d_2$ of the adjustment member 22 to adjust the vanes 42 to the selected angle $\alpha$. Stated differently, reduced adjustment of the adjustment member 22 can provide greater angle $\alpha$ adjustments of the vanes 42 by decreasing the distance $d_1$ between the pivot members 86 and the interface between the vanes 42 and the adjustment member 22.

Referring to FIGS. 1-17, the air register assembly 10 is configured to direct the air in a variety of directions within the passenger cabin 66. The adjustment member 22 is configured to be adjusted vertically within the barrel 18 to adjust the angle of the vanes 42. The angle adjustment of the vanes 42 can direct air up and down relative to the barrel 18. Moreover, the barrel 18 is configured to rotate. The rotation of the barrel 18 can direct air left and right within the passenger cabin 66. Additionally or alternatively, rotation of the knob assembly 50 can open and close the air register assembly 10. In a non-limiting example, the knob assembly 50 can rotate the elongate member 114, which can be coupled to a lever and/or doors to open and close the duct 166. In another non-limiting example, the knob assembly 50 can be coupled with the door assembly 174 to open and close the duct 166.

Use of the present disclosure may provide for a variety of advantages. For example, the linking member 98 may be concealed from view by the adjustment member 22. Additionally, the air register assembly 10 may include a single set of vanes 42. Also, operation of the door assembly 174 may not depend on the position of the knob assembly 50 and/or the barrel 18. Accordingly, the knob assembly 50 may be adjusted vertically with the adjustment member 22 and rotation of the knob assembly 50 may operate the rotation of the door assembly 174. Further, the distance $d_1$ between the rotational axis 90 and the interface between the vanes 42 and the adjustment member 22 can be reduced while maintaining the angled positions of the vanes 42. Moreover, the knob assembly 50 may be maintained in a horizontal position as the knob 54 is rotated and/or as the adjustment member 22 is vertically adjusted relative to the barrel 18. Additional benefits or advantages may be realized and/or achieved.

According to various examples, a vehicle air register assembly includes a barrel. An adjustment member extends between a first side and a second side of the barrel. The adjustment member includes a housing and an engagement feature. A plurality of vanes are pivotally coupled to the barrel. Each vane defines a recess. The engagement feature extends through each recess. A knob assembly is coupled to the housing. The knob assembly includes a knob, a connector, and a base. The connector and the base are disposed within the housing. Embodiments of the present disclosure may include one or a combination of the following features:
  an elongated member is disposed within a channel that is defined by an adjustment member;
  a base defines a first gear and an elongate member defines a second gear, and the first gear is configured to engage the second gear to translate rotation of a knob into rotation of an elongate member;
  a linking member is disposed within a channel, and the linking member is coupled to each vane proximate a rotational axis, respectively;
  a door assembly has a first gear, and the base defines a second gear that is configured to engage the first gear to translate rotation of a knob to rotation of the door assembly between a first position and a second position;
  a door assembly includes a first door and a second door, and the first door and the second door abut one another when in a first position and define an angle therebetween in a second position; and
  an engagement feature defines a plurality of notches, and each vane is disposed within a corresponding notch.

According to another example, an air register assembly for a vehicle includes a barrel. A vane is pivotally coupled to the barrel. The vane defines a recess. An adjustment member is configured to movably engage a side of the barrel. The adjustment member is disposed within the recess. A linking member is disposed within a channel defined by the adjustment member. The linking member is coupled to the vane within the recess. A knob assembly is coupled to the adjustment member. Embodiments of the present disclosure may include one or a combination of the following features:
  a knob assembly includes a knob rotatably coupled to an adjustment member and a base coupled to a knob via a connector, and the base and the connector are disposed within a housing defined by the adjustment member;
  an elongate member is disposed within a channel, and a proximal end of the elongate member is disposed proximate a knob assembly and a distal end of the elongate member is disposed proximate a side of a barrel;
  a knob assembly defines a first gear and an elongate member defines a second gear configured to engage a first gear, and the first gear is configured to translate rotation of a knob assembly to rotation of the elongate member;
  a linking member is coupled to a vane proximate a rotational axis of the vane;
  a knob assembly is in a horizontal position when a vane is positioned at a first angle and when the vane is positioned at a second angle; and
  an adjustment member includes a housing and an engagement feature extends from the housing, and a knob assembly is disposed at least partially within the housing.

According to another example, an air register assembly for a vehicle includes a barrel. A vane is pivotally coupled to the barrel. An adjustment member has a housing and an engagement feature that extends from the housing. The engagement feature is coupled to the vane. A knob assembly includes a knob and a base. The base defines a first gear. The knob and the base are disposed on opposing sides of the housing. A door assembly includes a second gear. The first gear is configured to engage the second gear to move the door assembly between a first position and a second position. Embodiments of the present disclosure may include one or a combination of the following features:

- a door assembly includes a first door and a second door, and the first door is configured to move in a first direction and the second door is configured to move in a second direction when the second gear engages the first gear;
- an engagement feature defines a notch, and a vane is disposed within the notch;
- an engagement feature is coupled to a vane proximate a rotational axis;
- a barrel defines a receiving cavity configured to receive an end of an adjustment member, and the adjustment member is movably engaged with the barrel; and
- a knob assembly is in a horizontal position when a vane is positioned at a first angle and when the vane is positioned at a second angle.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length and/or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle air register assembly, comprising:
   a barrel;
   an adjustment member extending between a first side and a second side of the barrel, wherein the adjustment member includes a housing and an engagement feature;
   a plurality of vanes pivotally coupled to the barrel, wherein each vane defines a recess, the engagement feature extending through each recess;
   a knob assembly coupled to the housing, wherein the knob assembly includes a knob, a connector, and a base, and wherein the connector and the base are disposed within the housing; and
   an elongate member disposed within a channel defined by the adjustment member, wherein the base defines a first gear and the elongate member defines a second gear, and wherein the first gear is configured to engage the second gear to translate rotation of the knob into rotation of the elongate member.

2. The vehicle air register assembly of claim 1, further comprising:
   a linking member disposed within the channel, and wherein the linking member is coupled to each vane proximate a rotational axis, respectively.

3. An air register assembly for a vehicle, comprising:
   a barrel;
   a vane pivotally coupled to the barrel, wherein the vane defines a recess;
   an adjustment member configured to movably engage a side of the barrel, wherein the adjustment member is disposed within the recess;
   a linking member disposed within a channel defined by the adjustment member, wherein the linking member is coupled to the vane within the recess; and
   a knob assembly coupled to the adjustment member.

4. The air register assembly of claim 3, wherein the knob assembly includes a knob rotatably coupled to the adjustment member and a base coupled to the knob via a connector, and wherein the base and the connector are disposed within a housing defined by the adjustment member.

5. The air register assembly of claim 3, further comprising:
an elongate member disposed within the channel, wherein a proximal end of the elongate member is disposed proximate the knob assembly and a distal end of the elongate member is disposed proximate a side of the barrel.

6. The air register assembly of claim 5, wherein the knob assembly defines a first gear and the elongate member defines a second gear configured to engage the first gear, and wherein the first gear is configured to translate rotation of the knob assembly to rotation of the elongate member.

7. The air register assembly of claim 3, wherein the linking member is coupled to the vane proximate a rotational axis of the vane.

8. The air register assembly of claim 3, wherein the knob assembly is in a horizontal position when the vane is positioned at a first angle and when the vane is positioned at a second angle.

9. The air register assembly of claim 3, wherein the adjustment member includes a housing and an engagement feature extending from the housing, and wherein the knob assembly is disposed at least partially within the housing.

10. The vehicle air register assembly of claim 1, wherein the knob assembly is in a horizontal position when the vane is positioned at a first angle and when the vane is positioned at a second angle.

11. The vehicle air register assembly of claim 1, wherein each of the first and second gears is disposed within the housing.

12. The vehicle air register assembly of claim 1, wherein the knob assembly includes a guide feature disposed proximate to the knob to maintain an engagement between the first and second gears.

13. A vehicle air register assembly, comprising:
a barrel;
an adjustment member extending between a first side and a second side of the barrel, wherein the adjustment member includes a housing and an engagement feature;
a plurality of vanes pivotally coupled to the barrel, wherein each vane defines a recess, the engagement feature extending through each recess;
a knob assembly coupled to the housing, wherein the knob assembly includes a knob, a connector, and a base, and wherein the connector and the base are disposed within the housing; and
an elongate member disposed within a channel defined by the adjustment member, and
a linking member disposed within the channel, and wherein the linking member is coupled to each vane proximate a rotational axis, respectively.

14. The vehicle air register assembly of claim 13, wherein each vane defines a recess, and wherein the linking member extends through a space defined by each recess.

15. The vehicle air register assembly of claim 13, wherein each vane includes a hook, and wherein the linking member includes protrusions, the hooks configured to engage the protrusions to couple the vanes to the linking member.

16. The vehicle air register assembly of claim 13, the linking member includes a coupling feature to couple the linking member to the adjustment member.

\* \* \* \* \*